United States Patent
Riegebauer

(10) Patent No.: US 7,809,872 B2
(45) Date of Patent: Oct. 5, 2010

(54) MASTER AND SLAVE DEVICE FOR COMMUNICATING ON A COMMUNICATION LINK WITH LIMITED RESOURCE

(75) Inventor: Josef Riegebauer, Ilz (AT)

(73) Assignee: Infineon Technologies AG, Neubiberg (DE)

( * ) Notice: Subject to any disclaimer, the term of this patent is extended or adjusted under 35 U.S.C. 154(b) by 185 days.

(21) Appl. No.: 11/956,803

(22) Filed: Dec. 14, 2007

(65) Prior Publication Data

US 2009/0157928 A1 Jun. 18, 2009

(51) Int. Cl.
 G06F 13/00 (2006.01)
 G06F 13/40 (2006.01)
 H04B 1/56 (2006.01)

(52) U.S. Cl. ............. 710/110; 710/307; 710/29; 710/45; 710/105; 710/106; 370/212; 370/232; 370/250; 370/276; 370/468; 375/257; 455/41.1; 455/41.2

(58) Field of Classification Search ............. 710/29, 710/45, 105, 106, 110, 307; 370/235, 276; 375/257

See application file for complete search history.

(56) References Cited

U.S. PATENT DOCUMENTS

| | | | |
|---|---|---|---|
| 5,436,887 A * | 7/1995 | Eisenhuth | 370/276 |
| 5,579,299 A | 11/1996 | Halter et al. | |
| 5,657,324 A * | 8/1997 | Itkin | 370/276 |
| 6,112,275 A * | 8/2000 | Curry et al. | 711/100 |
| 6,778,557 B1 * | 8/2004 | Yuki et al. | 370/468 |
| 6,831,925 B1 | 12/2004 | Subrahmanyan et al. | |
| 7,099,969 B2 * | 8/2006 | McAfee et al. | 710/107 |
| 7,143,215 B2 * | 11/2006 | Dunstan et al. | 710/104 |
| 7,349,431 B2 * | 3/2008 | Svacek et al. | 370/468 |
| 7,409,481 B2 * | 8/2008 | Clark et al. | 710/105 |
| 7,447,825 B2 * | 11/2008 | Chen | 710/307 |
| 7,480,757 B2 * | 1/2009 | Atherton et al. | 710/313 |
| 7,500,031 B2 * | 3/2009 | Pong | 710/58 |
| 7,580,413 B2 * | 8/2009 | Li Po et al. | 370/395.4 |
| 7,606,955 B1 * | 10/2009 | Falik et al. | 710/110 |

(Continued)

FOREIGN PATENT DOCUMENTS

DE 41 08 796 A1 9/1992

(Continued)

OTHER PUBLICATIONS

"ETSI TS XXX YYY V7.0.0—Smart cards; UICC-CLF interface; Physical and logical characteristics (Release 7)"—29 pages; Dated Aug. 2006.*

(Continued)

Primary Examiner—Mark Rinehart
Assistant Examiner—Brian T Misiura
(74) Attorney, Agent, or Firm—Dickstein, Shapiro, LLP.

(57) ABSTRACT

A master device for communicating with a number of slave devices through a communication link having a limited resource. The master device comprises a transceiver adapted for communicating with the slave devices on the communication link and a controller adapted for detecting the number of slave devices. The controller is adapted for determining an individual resource associated with a slave device to be consumed from the communication link, wherein a sum of the individual resources of all slave devices is lower than the limited resource and wherein the transceiver is adapted for assigning the individual resources to the associated slave devices.

13 Claims, 7 Drawing Sheets

U.S. PATENT DOCUMENTS

| | | | |
|---|---|---|---|
| 2005/0185720 A1* | 8/2005 | Kwok | 375/257 |
| 2007/0027698 A1 | 2/2007 | Daul et al. | |
| 2007/0177679 A1* | 8/2007 | Sovenyi | 375/257 |
| 2008/0049606 A1* | 2/2008 | Rhelimi et al. | 370/212 |
| 2008/0177915 A1* | 7/2008 | Erdmenger et al. | 710/106 |
| 2009/0011648 A1* | 1/2009 | Kargl et al. | 439/630 |

FOREIGN PATENT DOCUMENTS

EP    0 797 881 B1    8/2000

OTHER PUBLICATIONS

"Management of Multiple Cards in NFC-Devices"—13 pages; Dated 2008.*

* cited by examiner

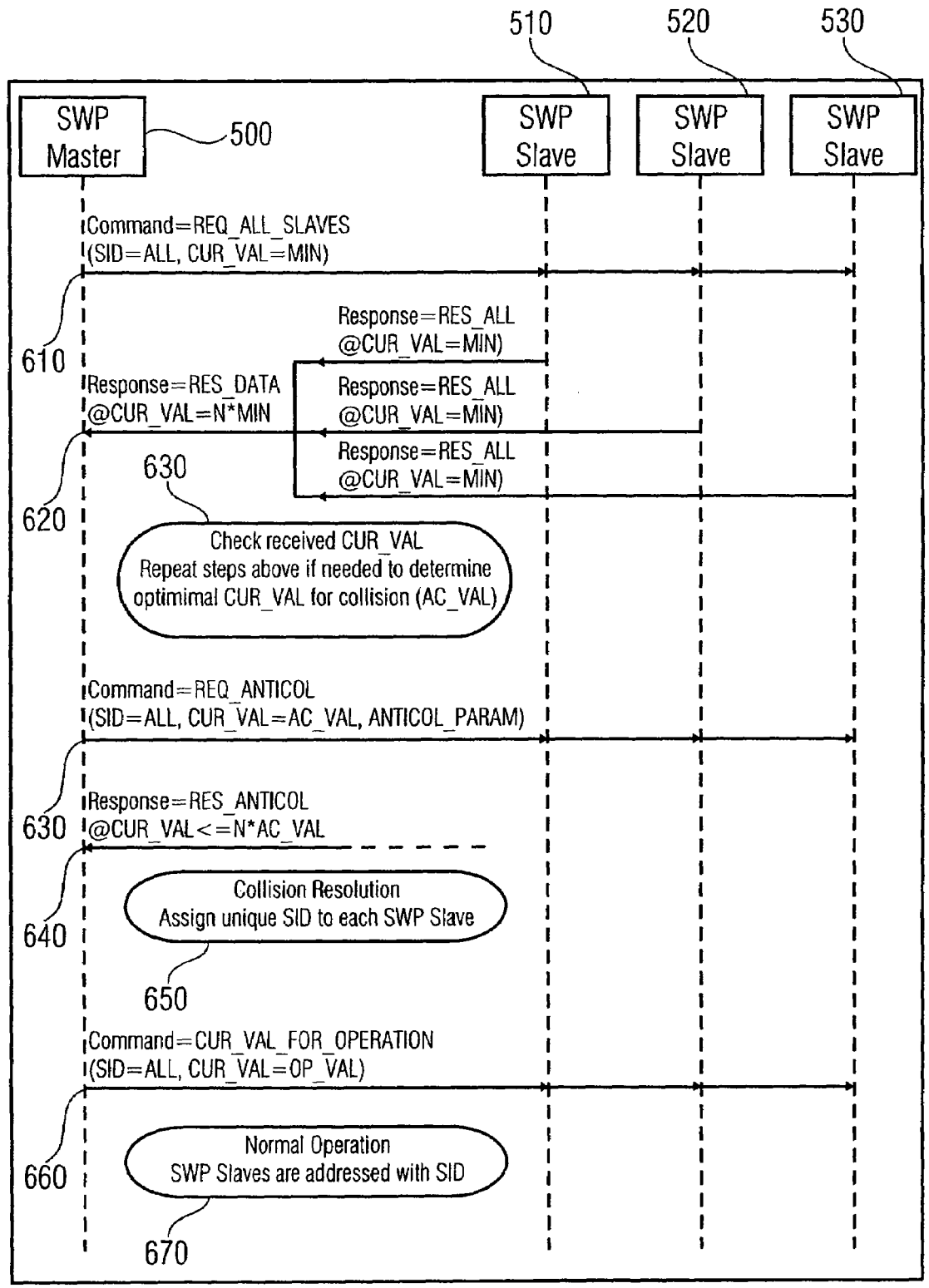

MASTER AND SLAVE DEVICE FOR COMMUNICATING ON A COMMUNICATION LINK WITH LIMITED RESOURCE

BACKGROUND

Embodiments of the present invention relate to communication scenarios with a master device and a potential number of slave devices, where collisions by simultaneous communications of devices may occur.

In communication systems where a permanent synchronization between communicating devices is not maintained, collisions can occur. These collisions refer to the event, where multiple communication entities communicate simultaneously in a manner that communication resources are over utilized. In some scenarios, such collisions may even lead to a communication breakdown of a communication system.

A conventional system wherein collisions may occur is the so-called single wire protocol (SWP=Single Wire Protocol). One characteristic of SWP is a full duplex physical communication link, wherein data may be transferred in the voltage domain, in the following also referred to as S1, and in the current domain, in the following also referred to as S2, simultaneously. In other words, communication can be carried out by communicating on a single wire, utilizing voltage and current signals at the same time. For example, a first device could transmit data over the wire by using voltage signals to a second device, which in turn communicates data to the first device by adjusting a current, which is drawn from the first device.

SWP can for example be used to connect contactless front ends (CLF=Contactless Front End) to a subscriber identity module (SIM=Subscriber Identity Module) in mobile devices equipped with a contact less subsystem, which is also known as an NFC system (NFC=Near Field Communication). These systems may for example be implemented in mobile phones, mobile computers, etc. In some scenarios, communication between a CLF and a SIM may only be a point-to-point communication or interface. In other scenarios, there can be a potential need for a multi-point communication link, i.e. one SWP master may communicate to multiple SWP slaves. These scenarios can occur if multiple SWP slaves are present. In some scenarios, SWP slaves may be replaceable or removable secured elements.

In scenarios where multiple slave entities are present, collisions may occur in terms of simultaneous communication of said slave entities. Especially in a SWP scenario, collisions may occur, as SWP slaves can communicate using the S2 domain, i.e., by drawing a current from the master entity. In cases when multiple slaves draw current simultaneously from a master, the master may become overloaded. This can especially be relevant in scenarios where for communication stability, a current drawn by a slave is set to a higher value. In such scenarios, a current drawn by multiple slaves may exceed the limit of a master's output driver and may cause overloads, in particular possibly having undesirable side effects on, for example, the contactless subsystem which may only be powered from an RF-field (RF=Radio Frequency).

SUMMARY

Embodiments of the present invention comprise a master device for communicating with a number of slave devices through a communicating link having limited resources. The master device comprises a transceiver adapted for communicating with the slave devices on the communication link and a controller adapted for detecting the number of slave devices and for determining an individual resource associated with a slave device to be consumed from the communication link, wherein a sum of the individual resources of all slave devices is lower than the limited resource and wherein the transceiver is adapted for assigning the individual resources to the associated slave devices.

DRAWINGS

Some embodiments of the present invention will be detailed using the accompanying figures, in which:

FIG. 6 shows an embodiment of a message sequence chart.

DETAILED DESCRIPTION

Figure 1A:
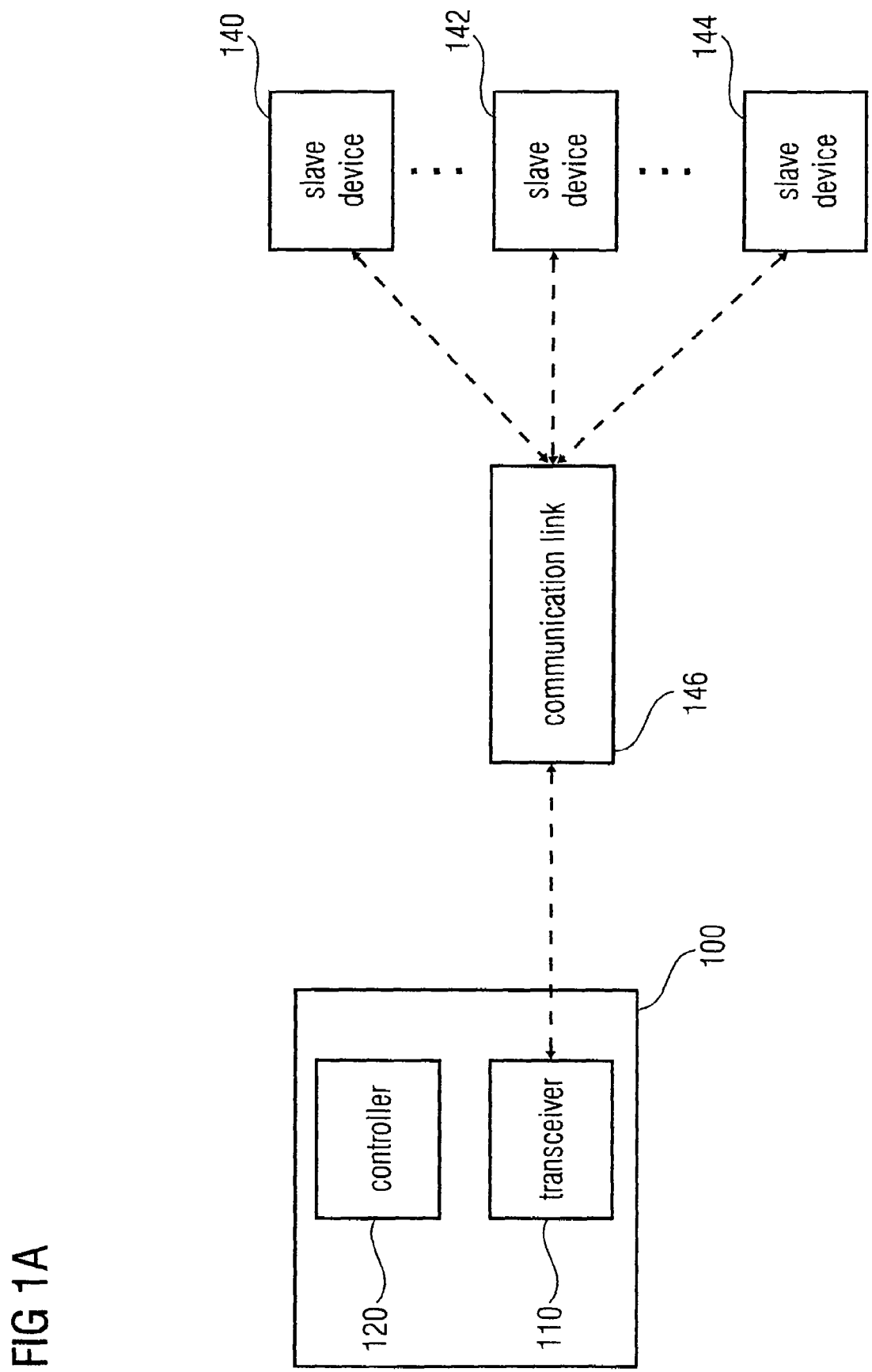
FIG. 1a shows an embodiment of a master device.

FIG. 1a shows an embodiment of a master device 100 for communicating with a number of slave devices 140, 142 and 144 through a communication link 146 having a limited resource. In the scenario depicted in FIG. 1a there are three slave devices 140, 142 and 144, which serve as an example. In other scenarios, a number of slave devices may be higher or lower than three. The master device 100 comprises a transceiver 110, which is adapted for communicating with the slave devices 140, 142 and 144 on the communication link 146. The master device 100 comprises a controller 120, which is adapted for detecting the number of slave devices and for determining an individual resource associated with a slave device to be consumed from the communication link 146, wherein a sum of the individual resources of all slave devices is lower than the limited resource and wherein the receiver 110 is adapted for assigning the individual resources to the associated slave devices.

In embodiments the transceiver 110 can be adapted for transmitting data to a slave device using a voltage signal and for receiving data from the slave device by detecting a current strength signal drawn by said slave device. The transceiver 110 can be adapted for communicating with the slave devices 140, 142 and 144 according to the SWP specifications, ETSI TS 1026130 (ETSI=European Telecommunications Standards Institute, TS=Technical Specification).

The controller 120 can be adapted for determining the number of slave devices by first assigning a minimum resource to all slave devices and by subsequently determining a combined resource during a simultaneous communication of all slave devices. In embodiments the controller 120 may be adapted for iteratively determining the individual resources.

Figure 1B:
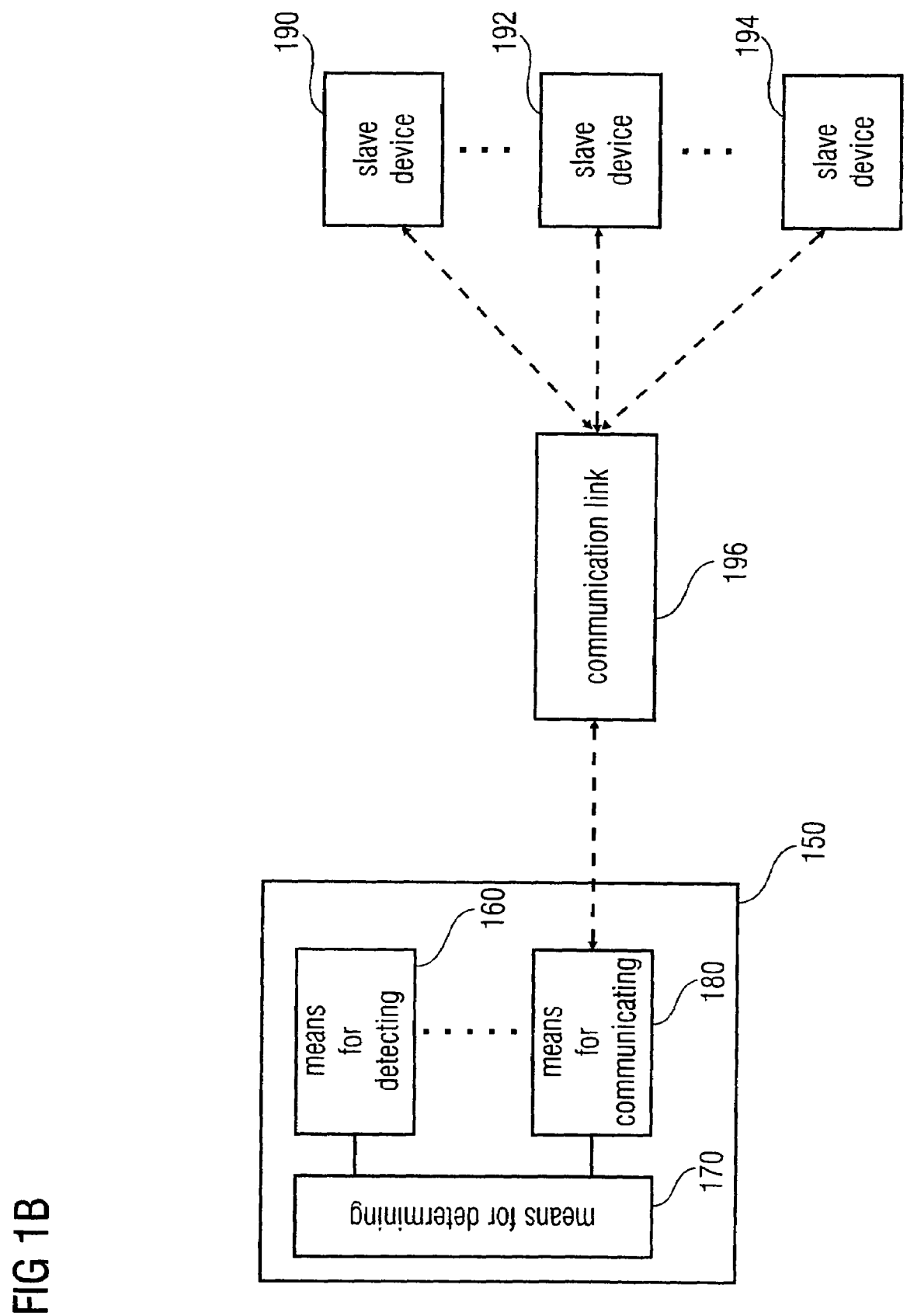
FIG. 1b shows another embodiment of a master communication device.

FIG. 1b shows an embodiment of a master communication device 150 for communicating with a number of slave communication devices 190, 192 and 194, on a communication link 196. The slave communication devices 190, 192 and 194 consuming transmission resources from the communication link 196 when communicating with the master communication device 150, wherein the communication link 196 has a limited resource. The master communication device 150 comprises a means 160 for detecting the number of slave communication devices communicating on the communication link 196. Furthermore, the master communication device 150 comprises a means 170 for determining an individual resource to be consumed from the communication link 196 per slave communication device 190, 192 or 194, wherein a sum of the individual resources of the number of slave devices is lower than the limited resource. Moreover, the master communication device 150 comprises a means 180 for communicating the individual resources to the slave communication devices 190, 192 and 194.

In embodiments, the means 160 for detecting can be adapted for providing an initial resource, the means 180 for communicating can be adapted for communicating the initial resource to all slave communication devices and for providing a combined initial resource subsequent to a response of all the slave devices back to the means 160 for detecting, which can be further adapted for detecting the number of slave devices by comparing the combined initial resource to the initial resource. This embodiment is indicated by the dotted line between the means 160 for detecting and the means 280 for communicating in FIG. 1b.

In embodiments, the means 180 for communicating can be adapted for communicating according to the SWP communications, i.e. ETSI TS 102613. In embodiments, the individual resources may correspond to current strengths and the limited resource of the communication link 196 can correspond to a maximum current strength available from the means 180 for communicating. The means 180 for communicating can be adapted for transmitting data to a slave device 190, 192 or 194 by using a voltage signal and for receiving data from a slave device 190, 192 or 194 by detecting a current strength signal drawn by the slave device 190, 192 or 194.

Figure 2:
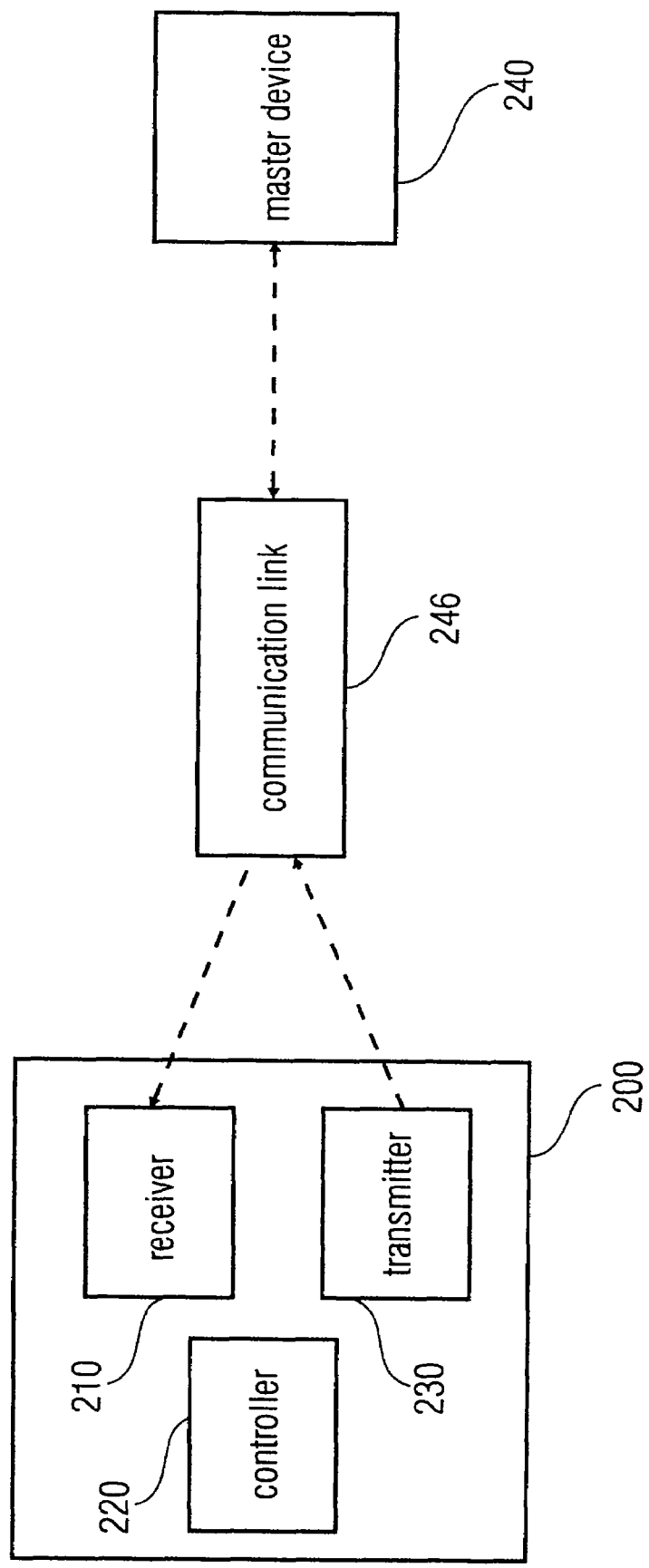
FIG. 2 shows an embodiment of a slave communication device.

FIG. 2 shows an embodiment of a slave communication device 200 for communicating with a master communication device 240 on a communication link 246, the slave communication device 200 consuming a transmission resource from the communication link 246 when transmitting to the master communication device 240. In the scenario depicted in FIG. 2 the master communication device 240 may correspond to a master device 100 or a master communication device 150 as it was described above.

The slave communication device 200 comprises a receiver 210, which is adapted for receiving an information on the transmission resource from the master communication device 240. Moreover, the slave communication device 200 comprises a controller 220, which is adapted for determining the transmission resource from the information and a transmitter 230, which is adapted for transmitting data to the master communication device 240 using the transmission resource.

In embodiments, the receiver 210 can be adapted for receiving information through a voltage signal and the transmitter 230 can be adapted for transmitting by drawing a current strength signal from the master communication device 240. The receiver 210 can be adapted for receiving and the transmitter 230 can be adapted for transmitting according to the SWP specifications (ETSI TS 102613).

In some embodiments the receiver 210 can be adapted for receiving as information on the transmission resource a maximum current strength and the transmitter 230 can be adapted for transmitting data by drawing currents of strength equal to or less than the maximum current strength. Furthermore, the receiver 210 can be adapted for receiving an information on a broadcast current strength, respectively, the transmitter 230 can be adapted for transmitting data by drawing a current according to the broadcast current strength as transmission resource within a predefined time frame after the information on the broadcast current strength has been received.

Figure 3:
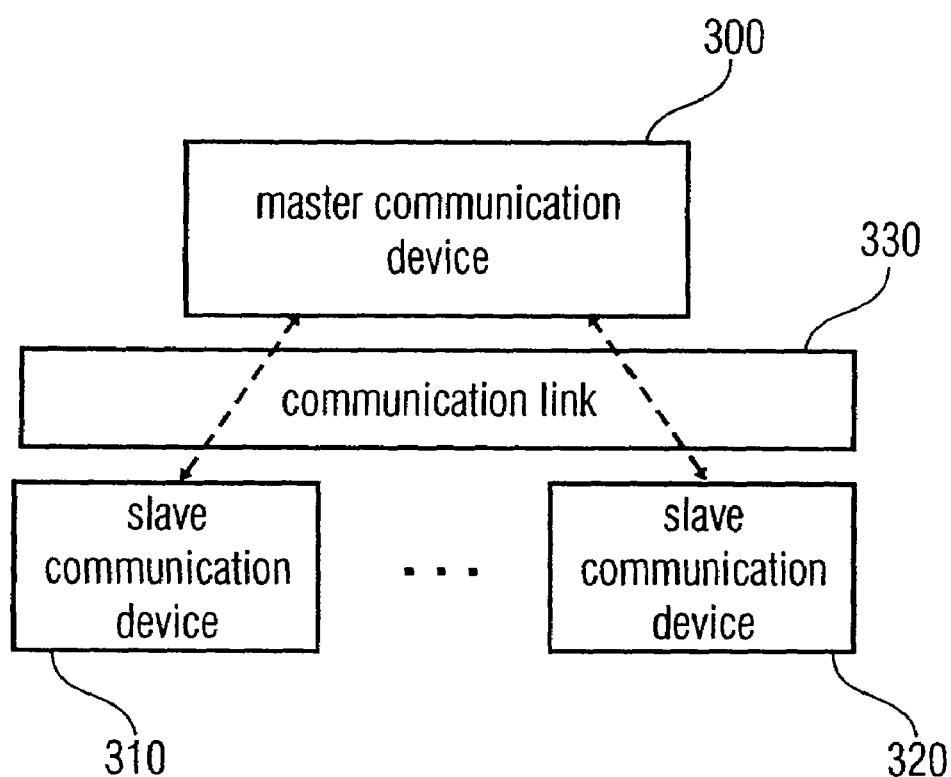
FIG. 3 shows an embodiment of a communication system.

FIG. 3 illustrates an embodiment of a communication system. FIG. 3 shows a master communication device 300, which corresponds to the master device 100 or the master communication device 150 as it was described above. Moreover, FIG. 3 shows a slave communication device 310 and another slave communication device 320, wherein both of the slave communication devices 310 and 320 may correspond to the slave communication device 200 as it was described above. In FIG. 3, two slave communication devices 310 and 320 are shown. However, in other embodiments of communication scenarios or systems, the number of slave communication devices may be higher or lower than two. Moreover, FIG. 3 shows that a master communication device 300 communicates with the slave communication devices 310 and 320 on a communication link 330. In embodiments of communication systems, a system may comprise a single master communication device 300 and a single slave communication device 310. According to the scenario depicted in FIG. 3, a system may comprise a plurality of slave communication devices 310, 320 communicating with the master communication device 300. According to the above description, a master communication device 300 can be adapted for using a voltage signal for communicating with a slave communication device 310, which can be adapted for using a current signal drawn from the master communication device 300 for communicating with the master communication device 300. Accordingly the slave communication device 320 can be adapted similarly.

In embodiments, the master communication device 300 and the slave communication device 310 can be adapted for communicating according to the SWP specifications, ETSI TS 102613, wherein a master communication device 300 can be further adapted for resolving a collision of slave device communication attempts by assigning predetermined time slots or a slot marker to said slave devices 310, 320.

Figure 4:
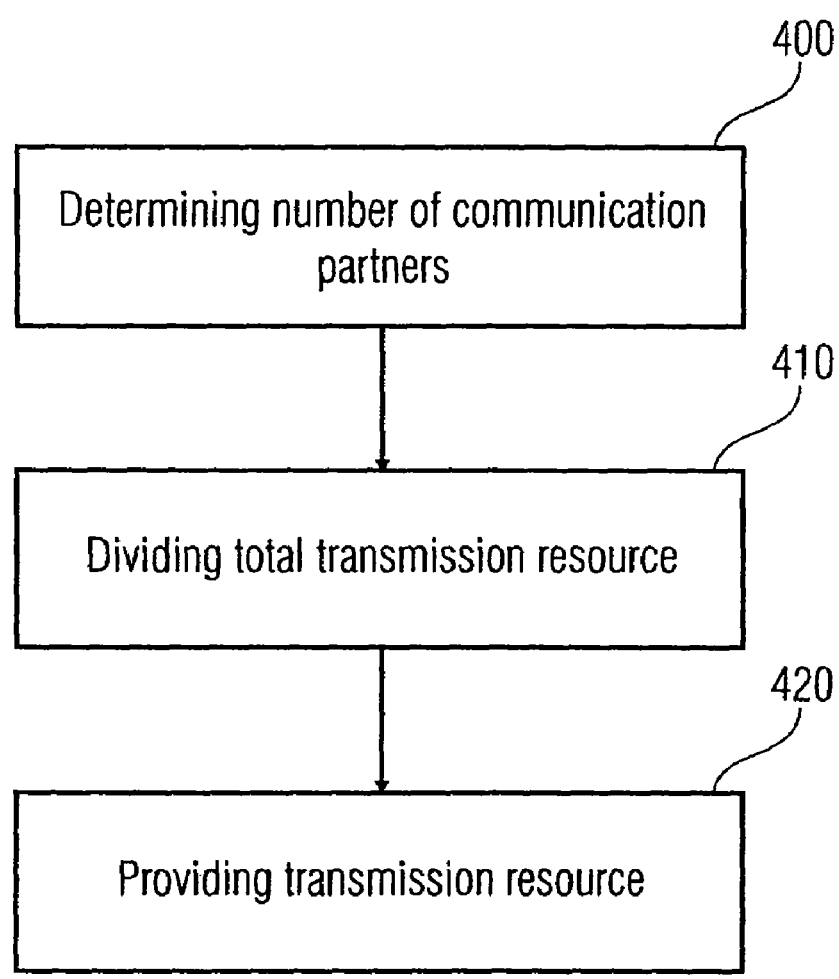
FIG. 4 shows a flow chart of an embodiment of a method.

FIG. 4 shows an embodiment of a method for providing a communication resource to a communication partner based on the total transmission resource. FIG. 4 shows a first step 400 of determining a number of communication partners and a second step 410 of dividing a total transmission resource by the number of communication partners to obtain a fractional transmission resource. Step 410 is followed by step 420 of providing a transmission resource to the communication partner, the transmission resource being equal to or less than the fractional resource.

In embodiments of methods, the step 400 of determining may comprise sub-steps of assigning an initial resource, broadcasting the initial resource to all communication partners, receiving a combined response from all communication partners consuming a combined resource, evaluating the combined resource and determining the number of communication partners by a relation of the combined resource and the initial resource.

In embodiments, assigning the initial resource may correspond to assigning a minimum resource. The providing of the transmission resource can comprise broadcasting information on the transmission resource to all communication partners. According to what was described above, the communication resource, the total communication resource and the fractional resource may correspond to current strengths. Furthermore, a communication partner may refer to a slave device 200 according to the SWP specifications, ETSI TS102613.

According to the above description, in a communication scenario SWP may be used. In such a scenario an embodiment of a master device 100, 150 may be adapted for adjusting a value of the S2 current in advance of a collision resolution scheme to a value, which may not exceed the output current limit of the master 100, 150, in case all slaves 200 draw currents simultaneously. This may be achieved in embodiments by the master device 100, 150 broadcasting a corresponding message to all slave devices 200. In embodiments, it may be assumed that the number of SWP slave devices 200 on a bus is limited.

In other embodiments, the master device 100, 150 may carry out pre-adjustment in a repetitive manner in order to adapt the current during collision resolution to an optimum value. Once the initial resources are assigned, collisions in the S2 domain may occur any time during the collision resolution process and thus embodiments are suitable for a wide variety of collision resolution mechanisms. In some embodiments, a time slot approach could be used in a scenario for contactless cards.

Figure 5:
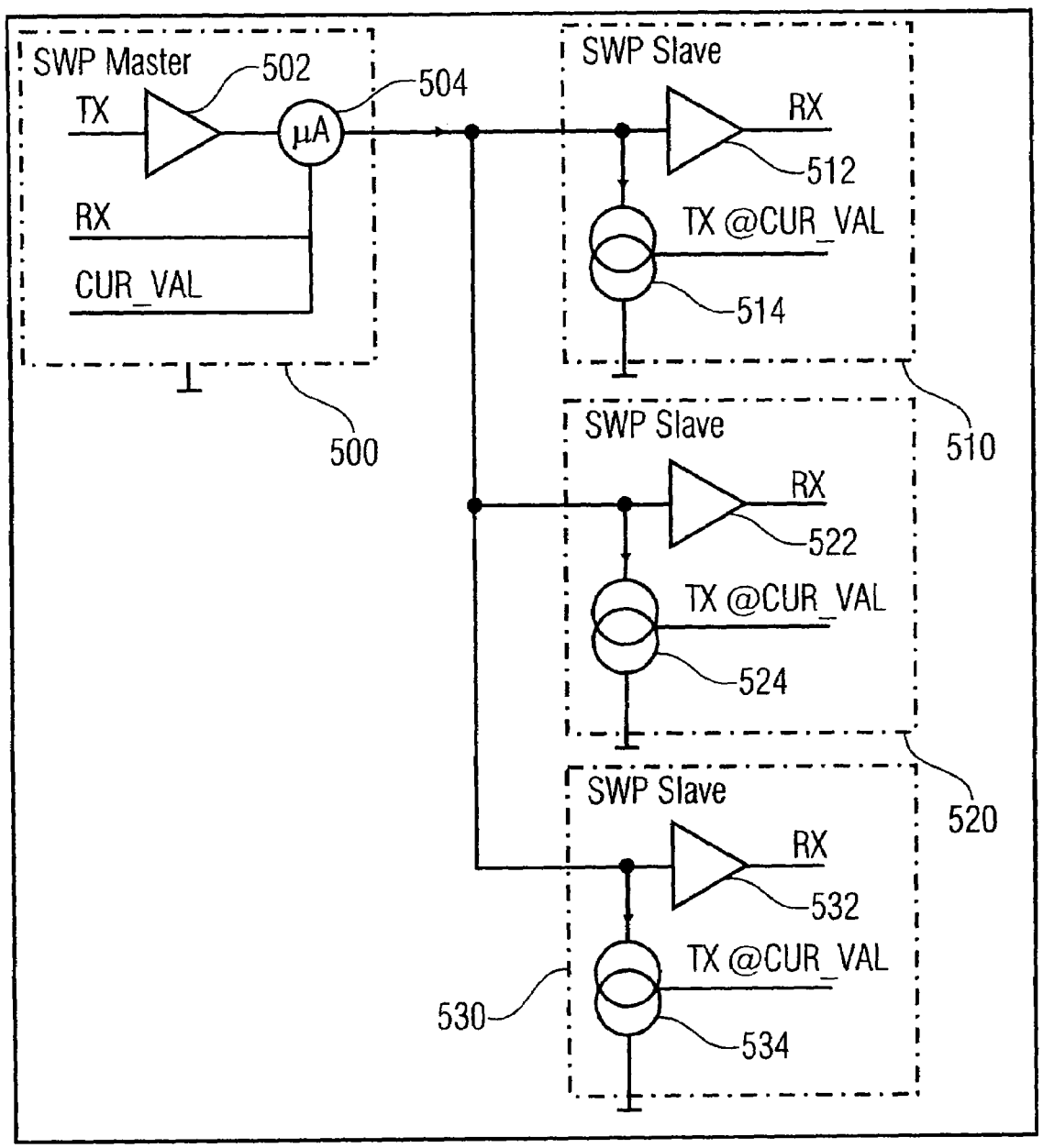
FIG. 5 shows another embodiment of a communication system.

FIG. 5 illustrates another communication scenario with a SWP master 500 and three SWP slaves 510, 520 and 530. The SWP master 500 corresponds to master device 100 respectively to a master communication device 150. The SWP master 500 comprises an amplifier 502 to transform a transmit signal "TX" to the voltage domain. At the output of the SWP master, there is a current measure device 504 for determining a current drawn from the amplifier 502, in order to determine a receive signal "RX" and a current value drawn "CUR_VAL".

The slave devices 510, 520 and 530 are similar in the scenario depicted in FIG. 5. Each of the SWP slave devices 510, 520 and 530 comprises an amplifier 512, 522 and 532. The amplifiers 512, 522 and 532 serve for determining the receive signal at the slave devices 510, 520 and 530, which are also labeled "RX" in FIG. 5. Moreover, each of the slave devices 510, 520 and 530 comprises a current source 514, 524 and 534 in order to draw current from the SWP master 500, for communicating the transmit signals labeled "TX@CUR_VAL".

As shown in FIG. 5, communication between the SWP master 500, and the SWP slaves 510, 520 and 530 is carried out through a single wire, using the SWP specifications.

For providing a better understanding of the communication of control information in the scenario depicted in FIG. 5, FIG. 6 illustrates an embodiment of a message sequence chart, displaying the messages between the SWP master 500 and the three SWP slaves 510, 520 and 530.

During a collision resolution process, embodiments may provide a "slave ID" (SID) to each of the slave devices. This may correspond to an address which is sent with every data packet in normal operation, wherein a SWP slave 510, 520, respectively, 530 etc., may respond only if the sent SID matches the assigned SID by the SWP master 500.

In FIG. 6, in a first step 610, the SWP master 500 communicates a command to all SWP slaves, 510, 520 and 530. This is indicated in FIG. 6 by setting the SID to "all". Moreover, in step 610 all SWP slaves 510, 520 and 530 are commanded to set their output current to a minimum value which is indicated in step 610 by "CUR_VAL=MIN". As indicated in step 610, the command relates to all slaves 510, 520 and 530, i.e., "COMMAND=REQ_ALL SLAVES".

The scenario depicted in FIGS. 5 and 6 shows three slave devices, however, in general any number of slave devices is conceivable. For example an SWP based system may be designed for a maximum of ten slaves. However, in the example shown in FIGS. 5 and 6, only three slaves 510, 520 and 530 are attached to the SWP master 500.

According to FIG. 5, the SWP master 500 has a means 504 to measure the S2 current and for the example it is assumed that the master device 500 is capable of detecting S2 signals in a range of 100 µA to 1000 µA. The slave devices 510, 520 and 530 provide means 514, 524 and 534 to adjust the S2 current in four steps. For example, 100/200/400/800 µA. According to FIG. 6, in step 610 the SWP master 500 broadcasts a current value of 100 µA. In step 620, all three slave devices 510, 520 and 530 may respond synchronously with 100 µA, upon which the master device 500 can detect 300 µA. This is indicated in FIG. 6 in step 620 by the three responses from the three SWP slave device 510, 520 and 530 communicating with their minimum current values, upon which the SWP master 500 can detect N*Min=3*100 µA=300 µA in the example depicted in FIGS. 5 and 6.

Step 620 is followed by step 630 in which the SWP master 500 may check the received current value, or in other embodiments, the SWP master 500 may repeat steps 610, respectively 620, if needed, in order to determine an optimal current value for a collision.

According to FIG. 6, the SWP master 500 may then respond to the slave devices 510, 520 and 530 in step 630, with a command requesting an anti-collision procedure, the command is communicated to all slave devices (SID=ALL) and the requested current value may be set according to the evaluation in step 630. In this example it is assumed that the SWP master 500 broadcasts a current value of 200 µA in step 630. As shown in FIG. 6, step 630, the command may also comprise further anti-collision parameters.

According to the above description, the SWP slave devices 510, 520 and 530 may respond according to step 620 in step 640, wherein the current used in step 640 is set to the value communicated in step 630. Thus, in step 640 all three slave entities 510, 520 and 530 respond synchronously with 200 µA, upon which the SWP master 500 detects 600 µA.

In step 650, the SWP master 500 assigns 200 µA as actual current value and may start a collision resolution procedure, which may involve assigning a unique SID to each SWP slave device 510, 520 and 530.

After collision resolution, another actual current value for normal operation can be sent to each of the slave devices 510, 520 and 530 by the SWP master 500 according to step 660 in FIG. 6. This can be carried out by the SWP master device 500 either by broadcasting or sending comments to each slave, which can be implemented differently in embodiments.

In embodiments for anti-collision procedures, a time slot approach with random SIDs may be utilized. The SWP master 500 may broadcast a number of time slots first, upon which each of the SWP slave devices 510, 520 and 530 can select a response slot and its SID randomly. The SWP master 500 may then broadcast a slot marker command. In turn, the SWP slave devices 510, 520 and 530, which have selected the slot number respond with their SIDs synchronously. The master device 500 may then detect no response, a proper response or a collision response and resolve the collision. In embodiments, slot assignments may be repeated in a loop, similar to the principle shown in ISO 14443 Type B.

After this, as also shown in step 670 in FIG. 6, normal operation can continue, for example SWP slave devices can be addressed with their SIDs. As mentioned above, at the end of a collision resolution, the SWP master 500 may broadcast a message to set the S2 current to the value for normal operation.

Embodiments of the present invention provide the advantage that multipoint communication on a link can be offered in an SWP architecture without the need for static ID assignments. Moreover, due to a limitation in the currents drawn, the embodiments provide an electrically stable environment, as the S2 current value can be made predictable in all situations by said embodiments. Moreover, embodiments enable re-use of said collision resolution mechanisms proven in contactless communications.

What is claimed is:

1. A master device for communicating with a number of slave devices through a communication link having a limited resource, the master device comprising:
- a transceiver adapted for communicating with the slave devices on the communication link, wherein the transceiver is adapted for transmitting data to a slave device using a voltage signal and for receiving data from the slave device by detecting a current strength signal drawn by said slave device; and
- a controller adapted for detecting the number of slave devices and for determining an individual resource associated with a slave device to be consumed from the communication link, wherein a sum of the individual resources of all slave devices is lower than the limited resource and wherein the transceiver is adapted for assigning the individual resources to the associated slave devices.

2. A master device for communicating with a number of slave devices through a communication link having a limited resource, the master device comprising:
- a transceiver adapted for communicating with the slave devices on the communication link, wherein the transceiver is adapted for communicating with the slave devices according to the SWP-specifications (SWP=Single Wire Protocol), ETSI TS 102613; and
- a controller adapted for detecting the number of slave devices and for determining an individual resource associated with a slave device to be consumed from the communication link, wherein a sum of the individual resources of all slave devices is lower than the limited resource and wherein the transceiver is adapted for assigning the individual resources to the associated slave devices.

3. A master device for communicating with a number of slave devices through a communication link having a limited resource, the master device comprising:
- a transceiver adapted for communicating with the slave devices on the communication ink; and
- a controller adapted for detecting the number of slave devices and for determining an individual resource associated with a slave device to be consumed from the communication link, wherein a sum of the individual resources of all slave devices is lower than the limited resource and wherein the transceiver is adapted for assigning the individual resources to the associated slave devices,
- wherein the controller is adapted for determining the number of slave devices by first assigning a minimum resource to all slave devices and by subsequently determining a combined resource during a simultaneous communication of all slave devices.

4. The master device of claim 1, wherein the controller is adapted for iteratively determining the individual resources.

5. A master communication device for communicating with a number of slave communication devices on a communication link, the slave communication devices consuming transmission resources from the communication link when communication with the master communication device, wherein the communication link has a limited resource, the master communication device comprising:
- a means for detecting the number of slave communication devices communicating on the communication link;
- a means for determining an individual resource to be consumed from the communication link per slave communication device,
- wherein a sum of the individual resources of the number of slave devices is lower than the limited resource: and
- a means for communicating the individual resources to the slave communication devices,
- wherein the means for detecting is further adapted for providing an initial resource, the means for communicating is further for communicating the initial resource to all slave communication devices and for providing a combined initial resource subsequent to a response of all the slave devices back to the means for detecting, which is further for detecting the number of slave devices by comparing the combined initial resource to the initial resource.

6. A master communication device for communicating with a number of slave communication devices on a communication link, the slave communication devices consuming transmission resources from the communication link when communicating with the master communication device, wherein the communication link has a limited resource, the master communication device comprising:
- a means for detecting the number of slave communication devices communicating on the communication link;
- a means for determining an individual resource to be consumed from the communication link per slave communication device,
- wherein a sum of the individual resources of the number of slave devices is lower than the limited resource; and
- a means for communicating the individual resources to the slave communication devices,
- wherein the means for communicating is adapted for communicating according to the SWP-specifications, ETSI TS 102613.

7. A master communication device for communicating with a number of slave communication devices on a communication link, the slave communication devices consuming transmission resources from the communication link when communication with the master communication device, wherein the communication link has a limited resource, the master communication device comprising:
- a means for detecting the number of slave communication devices communicating on the communication link;
- a means for determining an individual resource to be consumed from the communication link per slave communication device,
- wherein a sum of the individual resources of the number of slave devices is lower than the limited resource; and
- a means for communicating the individual resources to the slave communication devices,
- wherein the individual resources correspond to current strengths and the limited resource of the communication link corresponds to a maximum current strength available from the means for communicating.

8. A master communication device for communicating with a number of slave communication devices on a communication link, the slave communication devices consuming transmission resources from the communication link when communicating with the master communication device, wherein the communication link has a limited resource, the master communication device comprising:
- a means for detecting the number of slave communication devices communicating on the communication link;
- a means for determining an individual resource to be consumed from the communication link per slave communication device,
- wherein a sum of the individual resources of the number of slave devices is lower than the limited resource; and a means for communicating the individual resources to the slave communication devices, wherein the means for communicating is further for transmitting data to a slave device by using a voltage signal and for receiving data from a slave device by detecting a current strength signal drawn by the slave device.

9. method for providing a communication resource to a communication partner based on a total transmission resource, the method comprising:

determining a number of communication partners, wherein the determining comprises:
assigning an initial resource;
broadcasting the initial resource to all communication partners;
receiving a combined response from all communication partners consuming a combined resource;
evaluating the combined resource; and
determining the number of communication partners by a relation of the combined resource and the initial resource;

dividing the total transmission resource by the number of communication partners to obtain a fractional transmission resource; and providing the transmission resource to the communication partner, the transmission resource being less than or equal to the fractional resource.

10. The method of claim 9, wherein the assigning the initial resource comprises assigning a minimum resource.

11. The method of claim 9, wherein the providing of the transmission resource comprises broadcasting information on the transmission resource to all communication partners.

12. The method of claim 9, wherein the communication resource, the total communication resource and the fractional resource are current strengths.

13. The method of claim 9, wherein a communication partner refers to a slave device according to the SWP-specifications, ETSI TS 102613.

* * * * *